United States Patent Office 3,212,915
Patented Oct. 19, 1965

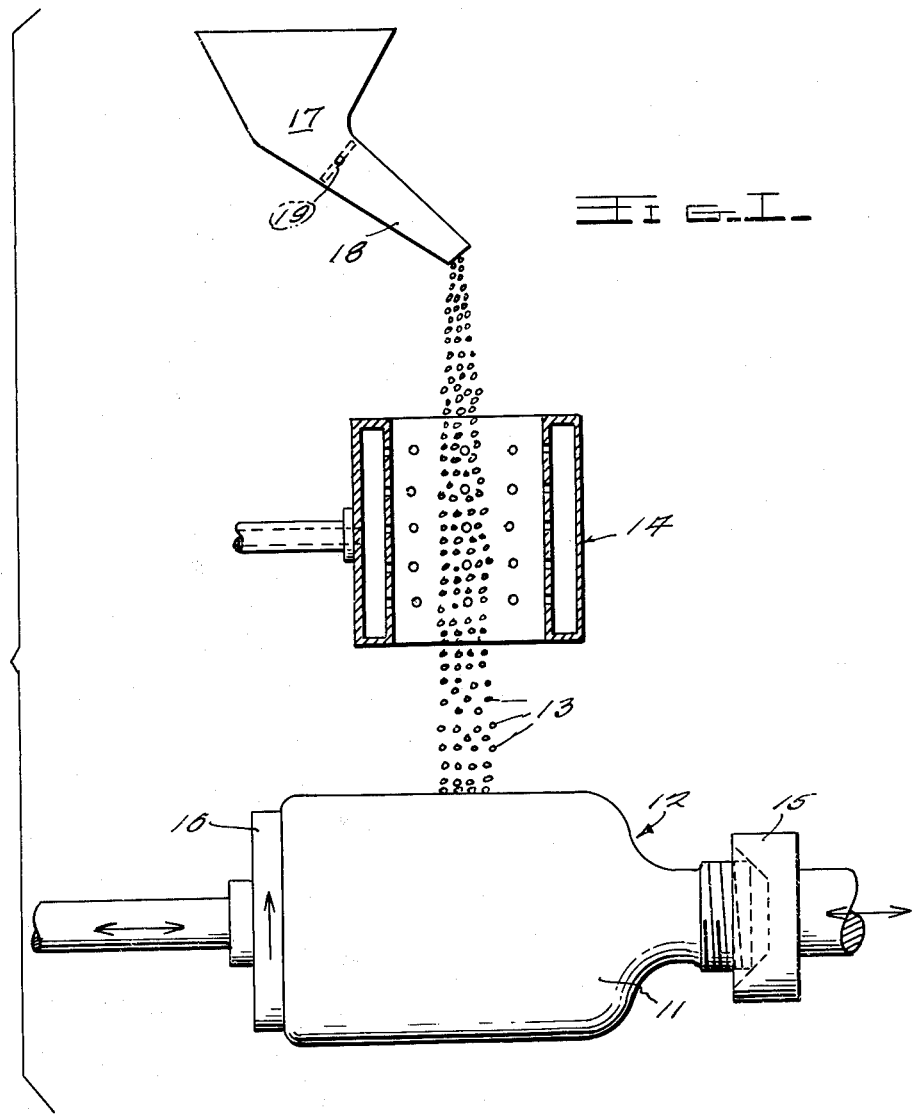
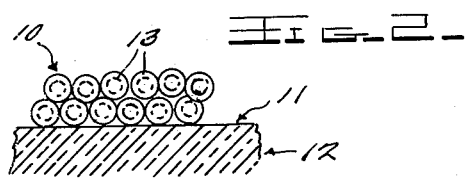

3,212,915
METHOD OF PRODUCING A SURFACE COATED ARTICLE
James W. Hackett, Sylvania, and Thomas R. Santelli, Toledo, Ohio, assignors to Owens-Illinois Glass Company, a corporation of Ohio
Filed June 29, 1961, Ser. No. 120,551
2 Claims. (Cl. 117—18)

Our invention relates to surface coated articles and methods of producing same.

An important object of our invention is the provision of an article, sheeting, or possibly a laminate, in which cellular plastic beads are fused together and to a surface or surfaces, thereby providing a protective and/or insulating layer.

A further object of our invention is the provision of a novel method for bonding or fusing a multiplicity of cellular, pre-expanded, or expandable, thermoplastic beads to a surface to produce a coating having both protective and insulating characteristics.

It is also an object of our invention to provide a method of applying a protective and insulating coating to a glass container involving heating the surface to be coated and then fusing to that surface and to each other a multiplicity of cellular polystyrene beads, the latter being pre-expanded, or in any event expandable.

Other objects will be in part apparent and in part pointed out hereinafter.

In the accompanying drawing forming a part of our application:

FIG. 1 is a view partly in section illustrating apparatus of one form capable of practicing the herein claimed method and showing a glass container being surface coated.

FIG. 2 is a fragmentary detail sectional view showing the coating or jacket as applied by our method.

Although we have illustrated our invention as utilized in applying a protective, insulating coating to the exterior surface of a glass container, it nevertheless may well be used in the coating of metal sheets, etc., and in the production of laminated sheeting such as those in which a layer of insulating material is faced on each flat surface with kraft paper or the like. According to our invention the insulating material would be cellular expanded polystyrene beads bonded together and to the facing sheets, which would be warmed or heated, prior to contact with the beads. Beads such as we may well utilize are described in U.S. Patents Nos. 2,681,321 and 2,857,342.

In the illustrated embodiment of our invention we are applying a protective, insulating coating or jacket 10 to the exterior surface 11 of selected areas of a glass bottle 12 or the like container. Accordingly, we heat or warm the surface to be coated and position same with its axis substantially horizontal in the path of a stream of advancing preheated cellular thermoplastic beads 13. These beads, which may be polystyrene, are expanded prior to contact with the surface being coated by reason of the pre-heating. They, however, may initially be completely pre-expanded or alternatively only partially expanded. In the latter event, they are passed through a heated atmosphere such as may be provided by a ring gas burner 14 wherein the temperature and time of exposure are adequate to effect the desired expansion and heating to insure fusing together of the beads and effective adhesion to the surface being coated. The temperature may be about 200° F. to 270° F. or in any event sufficiently low to insure against burning of the beads. Should the beads be pre-expanded, they will then be heated only sufficiently to insure fusing together and to the surface.

In the illustrated apparatus we have shown opposed neck and base chucks 15 and 16 which grip and support the bottle 12 between them and both rotate and reciprocate in order to present all surfaces to be coated to the stream of falling beads 13. Above the supported bottle 12 is the burner or heater 14 referred to heretofore. Beads 13 are delivered as a continuous stream by the feeder 17 which has a valved nozzle 18. The valve 19 regulates the rate of flow of beads, as is obvious.

In the application of a coating of polystyrene cellular beads, it is apparent from the foregoing that the preheated bottle, being held between the chucks 15 and 16 is rotated and reciprocated so as to insure coating of all surface areas desired. The cellular polystyrene beads 13, partially or completely pre-expanded, fall through the heated atmosphere provided by the burner 14. The length of the burner and heating time depend upon whether mere heating to the point of fusion is desired, or extended heating to actually expand the beads is required. In any event, the beads are expanded prior to contacting the bottle surface. Here the beads are fused together and as a film or coating to the glass surface.

Modifications may be resorted to within the spirit and scope of the appended claims.

We claim:
1. The method of applying a surface coating of expanded cellular plastic beads to an exterior heated surface of a generally cylinder-like article which consists in rotating the article on its axis with the latter substantially horizontal, passing expandable beads through a heated atmosphere to at least partially expand and partially fuse them, depositing these beads upon said heated surface as a continuous layer and moving the article axially during deposition of the beads upon said surface concurrently with rotation of the article so as to form a fused coating on said surface.

2. The method of applying a surface coating to an article which consists in heating the surface to be coated, flowing a stream of expandable plastic beads through a heated atmosphere to effect the desired final expansion of the beads to cellular form and impart such tackiness to the surface of the beads that they will fuse together and to the surface which is to be coated, positioning the article in the path of said stream of beads and imparting such multi-directional movement to the article as to insure deposition of the expanded heated beads in a substantially uniformly thick layer upon the heated surface of the article.

References Cited by the Examiner

UNITED STATES PATENTS

| 1,330,611 | 2/20  | Quinby et al. | 65—60 |
| 1,999,509 | 4/35  | Merritt | 117—21 |
| 2,862,834 | 12/58 | Hiler | 117—21 X |
| 2,948,393 | 8/60  | Gunkler | 117—94 |
| 2,974,060 | 3/61  | Dettling et al. | 117—21 |
| 3,006,780 | 10/61 | Schaefer | 117—18 |
| 3,037,897 | 6/62  | Pelley | 156—78 |

WILLIAM D. MARTIN, Primary Examiner.
RICHARD D. NEVIUS, Examiner.